(12) United States Patent
Riddle et al.

(10) Patent No.: US 8,620,235 B2
(45) Date of Patent: Dec. 31, 2013

(54) THERMAL MANAGEMENT FOR DATA MODULES

(75) Inventors: Christopher C. Riddle, San Diego, CA (US); Jon James Anderson, Boulder, CO (US); Alex K. Tu, San Diego, CA (US); Siva Sandeep Dhandu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 12/470,354

(22) Filed: May 21, 2009

(65) Prior Publication Data

US 2009/0290625 A1  Nov. 26, 2009

Related U.S. Application Data

(60) Provisional application No. 61/055,871, filed on May 23, 2008.

(51) Int. Cl.
*H01Q 11/12* (2006.01)
*H04B 1/04* (2006.01)
*H04B 1/16* (2006.01)

(52) U.S. Cl.
USPC .................. 455/117; 455/127.2; 455/217

(58) Field of Classification Search
USPC ........ 455/114.2, 117, 127.1, 127.2, 217, 230, 455/231, 296, 343.1
See application file for complete search history.

(56) References Cited

U.S. PATENT DOCUMENTS

| 7,555,661 | B2 | 6/2009 | Luu |
| 7,561,858 | B2 | 7/2009 | Nagano |
| 7,561,859 | B2 | 7/2009 | Nagano |
| 7,574,229 | B2 | 8/2009 | Kristensen et al. |
| 7,860,018 | B2 * | 12/2010 | Raith .............. 370/252 |
| 2002/0147932 | A1 * | 10/2002 | Brock et al. ........... 713/300 |
| 2004/0235438 | A1 * | 11/2004 | Quilisch et al. ....... 455/127.2 |
| 2005/0268133 | A1 | 12/2005 | Beard |
| 2006/0182021 | A1 | 8/2006 | Kristensen et al. |
| 2007/0083778 | A1 | 4/2007 | Nagano |
| 2007/0132607 | A1 | 6/2007 | Nagano |
| 2007/0242313 | A1 | 10/2007 | Shiomi |

(Continued)

FOREIGN PATENT DOCUMENTS

| EP | 1422596 A2 | 5/2004 |
| EP | 1758302 A1 | 2/2007 |

(Continued)

OTHER PUBLICATIONS

International Search Report—PCT/US2009/045077—International Search Authority, European Patent Office, Jan. 15, 2010.

(Continued)

*Primary Examiner* — Nguyen Vo
(74) *Attorney, Agent, or Firm* — Eric Ho

(57) ABSTRACT

A data module operable in a wireless communication system is provided. The data module comprises a plurality of circuit components, one or more temperature sensors, and a thermal management unit. The temperature sensors are configured to determine the temperature of a corresponding circuit component. The thermal management unit is configured to determine one or more thermal characteristics of the data module based on the temperature determinations, and to generate one or more power control point signals indicating whether to adjust corresponding operating characteristics of a target component based on the determined thermal characteristics.

100 Claims, 7 Drawing Sheets

(56) References Cited

U.S. PATENT DOCUMENTS

| | | | |
|---|---|---|---|
| 2007/0287383 A1* | 12/2007 | Fan et al. | 455/63.1 |
| 2009/0023402 A1* | 1/2009 | Shimizu et al. | 455/102 |
| 2009/0215442 A1* | 8/2009 | Lindoff et al. | 455/423 |
| 2009/0238086 A1 | 9/2009 | Ringstrom et al. | |
| 2010/0205464 A1* | 8/2010 | Rotem et al. | 713/300 |
| 2010/0213919 A1* | 8/2010 | Takayanagi et al. | 323/318 |
| 2011/0085607 A1 | 4/2011 | Dhandu et al. | |

FOREIGN PATENT DOCUMENTS

| | | |
|---|---|---|
| EP | 1873652 A2 | 1/2008 |
| GB | 2389022 A | 11/2003 |
| JP | 11505380 | 5/1999 |
| JP | 2002531023 A | 9/2002 |
| JP | 2006270910 A | 10/2006 |
| JP | 2006279815 A | 10/2006 |
| JP | 2006309533 A | 11/2006 |
| JP | 2006331307 A | 12/2006 |
| JP | 2007148572 A | 6/2007 |
| JP | 2007282097 A | 10/2007 |
| JP | 2008131319 A | 6/2008 |
| JP | 2008236342 A | 10/2008 |
| WO | 0031990 A2 | 6/2000 |
| WO | WO2007025139 A2 | 3/2007 |
| WO | 2009106490 A1 | 9/2009 |

OTHER PUBLICATIONS

Written Opinion—PCT/US2009/045077—ISA/EPO—Jan. 15, 2010.

Co-pending U.S. Appl. No. 08/426,551, filed Apr. 21, 1995.

* cited by examiner

THERMAL MANAGEMENT FOR DATA MODULES

CLAIM OF PRIORITY UNDER 35 U.S.C. §119

The present Application for patent claims priority to Provisional Application No. 61/055,871 entitled "Methods and Apparatuses for Thermal Management in User Equipment" filed May 23, 2008, and assigned to the assignee hereof and hereby expressly incorporated by reference herein.

BACKGROUND

1. Field of the Invention

The present disclosure relates generally to circuits, and more specifically to techniques, systems, and methods for thermal management for data modules.

2. Relevant Background

Data modules (e.g., embedded data cards, USB dongles, etc) are generally smaller than handsets (e.g., cell phones) so the data modules have less thermal mass and a smaller surface area as compared to handsets. Additionally, relatively high data rates are supported by data modules, requiring additional processing power. As a result, data module devices can become very hot as the maximum power dissipation is typically limited by the form factor of the device. That is, the data module may need to have some minimum surface area to meet thermal requirements. Alternatively, the data module may require active cooling mechanisms (e.g., heat sinks, fans, etc.). However, active cooling mechanisms consume additional space, and add both cost and complexity to the device. Accordingly, small form factor data modules without active cooling mechanisms are desirable.

Some data modules without active cooling have addressed this issue by simply limiting the maximum transmit power, or equivalently, lowering the power class of the device. However, this approach can lower the uplink data rates. For example, early EDGE data modules limited the multi-slot class of the device, which limited the maximum number of transmission slots. This approach tended to lower the uplink data rates in an undesirable manner.

SUMMARY

Exemplary embodiments of the invention are directed to systems and methods for thermal management of data modules, which may help maintain thermal conditions at an acceptable level.

One embodiment is directed to a data module operable in a wireless communication system. The data module comprises a plurality of circuit components, one or more temperature sensors, and a thermal management unit. The temperature sensors are configured to determine the temperature of a corresponding circuit component. The thermal management unit is configured to determine one or more thermal characteristics of the data module based on the temperature determinations, and to generate one or more power control point signals indicating whether to adjust corresponding operating characteristics of a target component based on the determined thermal characteristics.

Another embodiment is directed to a method for thermal management of a data module comprising a plurality of circuit components and operable in a wireless communication system. The method comprises determining a temperature of one or more of the circuit components, determining one or more thermal characteristics of the data module based on the temperature determinations, and adjusting at least one operating characteristic of one or more target components among the plurality of circuit components based on the determined thermal characteristics.

Another embodiment is directed to a data module operable in a wireless communication system. The data module comprises a plurality of circuit components, means for determining a temperature of one or more of the circuit components, means for determining one or more thermal characteristics of the data module based on the temperature determinations, and means for adjusting at least one operating characteristic of one or more target components among the plurality of circuit components based on the determined thermal characteristics.

Another embodiment is directed to a computer readable medium comprising code, which, when executed by a processor, causes the processor to perform thermal management operations for a data module comprising a plurality of circuit components and operable in a wireless communication system. The computer-readable medium comprises code for determining a temperature of one or more of the circuit components, code for determining one or more thermal characteristics of the data module based on the temperature determinations, and code for adjusting at least one operating characteristic of one or more target components among the plurality of circuit components based on the determined thermal characteristics.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
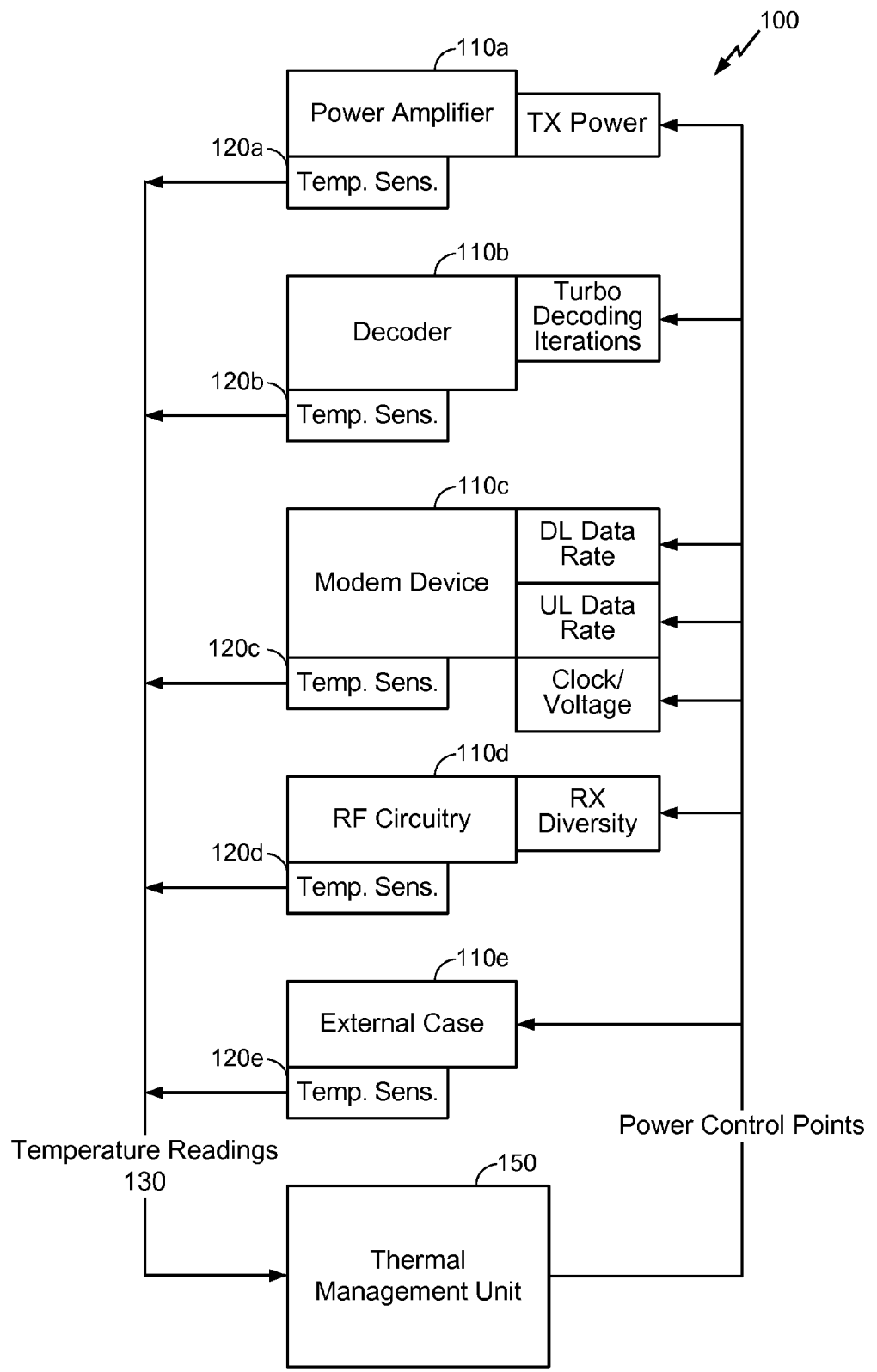
FIG. 1 illustrates a data module operable in a wireless communication system according to an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. The term data module as used herein is meant to be interpreted broadly as including any circuit arrangement capable of transmitting or receiving data in a wireless network (e.g., data cards), as well as any device incorporating such a circuit arrangement (e.g., handsets).

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

As discussed in the background, data modules without active cooling can be particularly susceptible to high temperatures and related problems. Accordingly, the present disclosure provides techniques to monitor thermal characteristics of data modules and actively maintain those thermal characteristics within acceptable levels. A closed loop feedback mechanism is utilized to monitor temperature and limit performance gracefully to keep the temperature in check.

FIG. 1 illustrates a data module operable in a wireless communication system according to an embodiment of the invention.

As shown, the data module 100 includes a power amplifier 110a, a decoder 110b, a modem device 110c, RF circuitry 110d, an external case 110e to house all the constituent components (collectively referred to as the data module components 110), corresponding temperature sensors 120a-120e (collectively referred to as the temperature sensors 120), and a thermal management unit (TMU) 150.

In general, the temperature sensors 120 determine the temperature of a corresponding data module component 110. The TMU 150 determines thermal characteristics of the data module 100 based on the temperature determinations. The TMU 150 then generates power control point signals indicating whether to adjust the operating characteristics of each component based on the determined thermal characteristics of the data module 100.

It will be appreciated that the particular circuit components 110 of FIG. 1 are shown for illustrative purposes only, and the actual number of components or the components themselves may vary depending on the application. For example, other circuit components may include a microprocessor, various memories, bus controllers, etc. It will also be appreciated that the stand-alone TMU 150 of FIG. 1 can alternatively be employed as part of a general purpose processor.

Thermal Characteristics

Referring back to FIG. 1, one or more temperature sensors 120 can be employed to gauge the real-time environment of the data module 100. For example, one device capable of measuring the temperature of circuit components is a thermistor. In other embodiments, other sensors that can detect or measure a thermal indicator for the system are employed. Other example sensors include, but are not limited to, Proportional to Absolute Temperature (PTAT) sensors and ring oscillators. In addition to direct temperature sensors such as thermistors, one or more of temperature sensors 120 may include a current monitor to indirectly measure temperature as a function of the current consumed by a corresponding component 110. For example, the power amplifier 110a may have well known thermal characteristics based on current consumption, and it may therefore be desirable to use a current monitor to indirectly measure temperature as temperature sensor 120a. In embodiments disclosed herein, thermistors or similar devices are used for global control of power consumption in regulating temperature throughout a data module. As described in greater detail in the following disclosure, global control can include the combination of monitoring and control of the various circuit components 110 (e.g., power amplifier, decoder modem device, RF circuitry, etc) to achieve temperature regulation of data module 100 via TMU 150.

The temperature readings 130 (also referred to herein as temperature determinations) are used to determine the system's thermal characteristics. For example, in some embodiments the component 110 with the highest temperature reading is taken as the critical system temperature and used in determining the system's thermal characteristics. In other embodiments, two or more component 110 temperature readings are aggregated in determining the system's thermal characteristics. Example thermal characteristics include, but are not limited to, the Thermal Status of the data module 100, the Thermal Slope of the data module 100, and a Thermal Time Constant for the data module 100 each of which will be described below in greater detail.

Thermal Status as used herein refers to a hierarchy of predetermined zones of operation or predetermined temperature ranges in which the data module 100 may be operating. In one embodiment, three zones of operation are defined: nominal, red, and emergency. The nominal zone of operation is defined for operation between a first temperature (e.g., about −20° C.) and a second temperature (e.g., about 50° C.). The red zone of operation is defined for operation between the second temperature (e.g., about 50° C.) and a third temperature (e.g., about 70° C.). In the red zone of operation, a user may feel that the device is hot to the touch. The emergency zone of operation can be any temperature above the third temperature (e.g., exceeding about 70° C.), where the device may be susceptible to failure if the temperature continues to rise or may be in danger of exceeding a given thermal requirement (e.g., a third party or external requirement).

Thermal Slope as used herein refers to the change in temperature of the data module 100 over time. For example, Thermal Slope can be represented as a plot of temperature on a vertical axis as a function of time on the horizontal axis. The Thermal Slope can be employed to predict or describe a thermal trend. For example, the future temperature in the next several seconds to next several minutes can be extrapolated or otherwise determined by using the Thermal Slope.

Thermal Time Constant as used herein refers to how a device heats up and arrives at steady state in a certain amount of time. The Thermal Time Constant is an indicator of how susceptible the device is to a thermal gradient. In one embodiment, the Thermal Time Constant is used in an exponential thermal model of the form exp((1/Thermal Time Constant)*t). Accordingly, the Thermal Time Constant generally indicates a measure of how a device responds to or reacts to a temperature change.

In some embodiments, the thermal characteristics are used in conjunction with a predetermined thermal model of the data module 100. The predetermined thermal model can be derived from a thermal characterization of the system, performed in advance of device operation, indicating how the data module 100 responds to temperature variations. In other embodiments, the device can be configured to determine or adapt its thermal model characteristics during operation based on temperature reading history. For example, each temperature sensor's 120 historical data may be stored and used to derive the Thermal Slope and/or Thermal Time Constant of the data module 100. In either case, the dynamic or predetermined thermal model is used to set thresholds, margins, etc., associated with the thermal characteristics in accordance with desired temperature design guidelines.

It will be appreciated that many gauges of the system's overall thermal characteristics can be used, and the above list is not to be considered exhaustive.

Data Module Operation Adjustments

Based on the determined thermal characteristics of the system (e.g., the data module), the TMU 150 detects whether a thermal event has occurred (e.g., based on Thermal Status) or will occur (e.g., based on Thermal Slope and/or Thermal Time Constant) requiring action to bring the data module 100 back to an acceptable operating point. If a thermal event is detected, the TMU 150 adjusts the operation of the data module in real-time to maintain the data module's 100 thermal characteristics at or below an acceptable level. To adjust the operating characteristics of the data module 100, the TMU 150 generates power control point signals for corresponding data module components 110 indicating whether to adjust a particular operating characteristic of each component 110. It will be appreciated that not all components 110 may actually receive a power control signal, even though they contribute to determining the thermal characteristics of the system (e.g., the external case 110e).

In some embodiments, the TMU 150 adjusts the operating characteristics of the modem 110c when a thermal event is detected.

For example, the TMU 150 can decrease the peak uplink data rate of the modem 110c, enabling the transmit power to be lowered without limiting the full range of transmit power available. Also, a decreased uplink data rate reduces the power consumed in building the data packets for transmission. In one embodiment, the uplink data rate is decreased by half, allowing the transmit power to be reduced by 3 dB while still maintaining the same signal-to-noise ratio (SNR) at the uplink receiver of the base station. In another embodiment, the peak uplink data rate is decreased further from about 5.6 Mbps to about 1.8 Mbps, reducing power consumption by about 100 mW.

When operating at the reduced data rate, the TMU 150 may also direct the modem 110c, and/or other transceiver processing circuits (e.g., corresponding processors, data buses, memories, memory controllers, etc.), to reduce associated clock frequency and voltage settings. In general, power consumption (and hence, heat generation) scales exponentially with voltage and linearly with clock frequency. Thus, a reduction in clock/voltage settings can help to bring the data module's 100 thermal characteristics back to an acceptable level. Moreover, when used in conjunction with a reduced data rate, reducing the clock/voltage settings further reduces power consumption without further limiting performance because the reduced data rate does not require the same level of processing power as the original, higher data rate. The appropriate clock/voltage settings for a given data rate may be application specific, and can be stored in a lookup table, for example. The TMU 150 can maintain the peak uplink data rate and/or corresponding clock/voltage settings at their reduced level until the Thermal Status returns to the normal zone. For example, the TMU 150 can wait a predetermined period of time for its procedures to take effect, and then recheck the thermal characteristics to determine if normal operation can be resumed. The predetermined period of time may be based on the calculated Thermal Time Constant of the device.

The TMU 150 can also decrease the peak downlink data rate. In a simple design, the modem 110c simply refuses to demodulate any packets received at a data rate above a given threshold. In other designs, a decreased peak downlink rate is achieved through coordination with the base station. For example, in one embodiment the handset re-registers itself with the base station using reduced call settings. In another embodiment, the handset renegotiates with the base station during an active call, either directly or indirectly. For example, the handset may artificially bias signal quality feedback information (e.g., SNR, channel quality indicator (CQI), data rate control (DRC), etc.) to imitate a lower quality of signal reception. By reporting to the base station an artificially poor signal condition, the base station should subsequently reduce the data rate allocated to the handset and begin transmitting packets at or below the reduced rate. In one embodiment, the peak downlink data rate may be decreased using this technique from about 28.8 Mbps to about 3.6 Mbps, reducing power consumption by about 110 mW.

Similar to the discussion above with regard to uplink data rate reduction, when operating at a reduced downlink data rate, the TMU 150 may also direct the modem 110c, and/or other transceiver processing circuits (e.g., corresponding processors, data buses, memories, memory controllers, etc.), to reduce associated clock frequency and voltage settings. Again, power consumption (and hence, heat generation) generally scales exponentially with voltage and linearly with clock frequency. Thus, a reduction in clock/voltage settings can help to bring the data module's 100 thermal characteristics back to an acceptable level. Moreover, when used in conjunction with a reduced data rate, reducing the clock/voltage settings further reduces power consumption without further limiting performance because the reduced data rate does not require the same level of processing power as the original, higher data rate. The appropriate clock/voltage settings for a given data rate may be application specific, and can be stored in a lookup table, for example.

The TMU 150 may maintain the peak downlink data rate and/or clock/voltage settings at their reduced level until the Thermal Status returns to the normal zone. For example, the TMU 150 can wait a predetermined period of time for its procedures to take effect, and then recheck the thermal characteristics to determine if normal operation can be resumed. The predetermined period of time may be based on the calculated Thermal Time Constant of the device.

In some embodiments, the TMU 150 adjusts the operating point of the RF circuitry 110d when a thermal event is detected.

For example, the TMU 150 can temporarily disable receive diversity. In one embodiment, the receive diversity circuit/feature is disabled and a single receive chain is used, saving about 50 mW. The period of time of single receiver operation may be based on real-time temperature measurements from the temperature sensors 120 indicating a sufficient improvement in the thermal characteristics of the data module 100 (e.g., until the Thermal Status returns to the normal zone). For example, measurements and calculations of the thermal characteristics of the system may be performed periodically in accordance with a predetermined thermal model (e.g., using the Thermal Time Constant). Once the thermal characteristics have been determined to return to an acceptable level, normal operation may resume.

In some embodiments, the RF circuitry 110d may take advantage of multi-carrier operation in which the handset is simultaneously assigned more than one carrier by a base station. Here, the TMU 150 can also temporarily disable multi-carrier operation by limiting operation to a single carrier or a reduced number of carriers. For example, selected carriers may be dropped through coordination with a base station. In one embodiment, the selected carriers are those with the poorest SNR values, or the like. This technique offers similar advantages to receive diversity reduction discussed above.

The TMU 150 can also temporarily disable other advanced receiver techniques that are processing intensive, such as equalizer or interference cancellation features. Disabling advanced receiver techniques can be advantageous under certain conditions in terms of a lower thermal profile and operating environment. In one embodiment, an equalizer circuit (not shown) or interference cancellation circuit (not shown) is disabled at the RF circuitry 110d by initiating simple rake receiver operation until the Thermal Status returns to the normal zone. Whether the Thermal Status has returned to the normal zone can be measured periodically (e.g., based on a predetermined thermal model) as part of a feedback control loop. In another embodiment, a mechanism is provided to disable one or more advanced receiver techniques when the SNR is above a predetermined threshold, indicating a good quality of service whereby the advanced receiver techniques are not essential. Here, since the SNR is sufficient, there may only be relatively minor performance degradation from disabling these advanced features. It will be appreciated that the temporary disabling of a feature such as removing the use of advanced receiver techniques can be utilized for power saving, lowering or maintaining a desired temperature or thermal characteristic, or for both purposes.

In some embodiments, the TMU 150 adjusts the operating point of the decoder 110b when a thermal event is detected.

For example, in an embodiment where the decoder 110b takes advantage of turbo decoding, the number of iterations for the turbo decoding may be reduced, or the turbo decoding may be halted entirely. For example, in a typical turbo decoder preset to execute eight iterations of decoding, the number of iterations may be scaled back to about five. Alternatively, the reduced number of iterations may be based on the perceived SNR or a feedback control loop indicating the relative convergence of each iteration.

In some embodiments, the TMU 150 adjusts the operating point of the power amplifier 110a when a thermal event is detected.

For example, the TMU 150 can directly limit uplink transmit power provided by the power amplifier 110a. In one embodiment, temporarily lowering the power class of the device is performed by reducing the maximum output transmit power of the power amplifier 110a. This technique can potentially save several hundred mW. In one embodiment, the transmit power limitation is applied until the thermal characteristics return to an acceptable level or for a predetermined duration (e.g., a duration set by a timer). After this duration, the power limitation is lifted, thereby enabling a return to full transmit power after a predetermined amount of time (e.g., several seconds) of reduced uplink performance.

Where the TMU 150 is coupled to or integrated with a general processor (e.g., a handset processor), in some embodiments the TMU 150 adjusts the operating point of the processor.

For example, the TMU 150 can limit other processing activities, such as other applications executing on the device. These applications can include multi-media applications, such as gaming applications, video applications, etc. In one embodiment, the TMU 150 limits transceiver operation to a substantially simplex mode. Here, transceiver rules are established and enforced to enter this mode. For example, a rule that disallows the execution of an uplink application (e.g., a file transfer application) concurrent with or simultaneously with a downlink application (e.g., a streaming video application) can be enforced.

In some designs, it is desirable to provide a level of hysteresis to the thermal management techniques by applying a threshold margin to one or more thermal characteristic thresholds such that the data module 100 is prevented from cycling between normal and reduced operation too frequently. For example, each upper Thermal Status zone (e.g., red zone and emergency zone) may have an associated threshold margin. Once a thermal event is detected and the desired thermal management procedures initiated, those procedures are carried out until the Thermal Status is returned not only to below the associated threshold (e.g., the red zone threshold), but further to below the threshold margin. In general, a data module 100 with a larger Thermal Time Constant (e.g., one having a larger thermal mass) takes longer to re-trigger a thermal event and is therefore assigned a smaller threshold margin. In one embodiment with a temperature threshold set to 70° C., for example, an associated margin may be set to about 8° C. Accordingly, once a thermal event is triggered in this embodiment, the temperature needs to be reduced to less than 62° C. before returning to normal operation. This helps ensure that a subsequent thermal event is not triggered immediately after returning to normal operation, and that such on/off performance cycles are not pervasive. In one embodiment, the threshold margin is determined based on the Thermal Time Constant of the data module 100.

In extreme cases, a thermal event may lead to a thermal emergency requiring more drastic actions to correct. For example, in the event of a thermal runaway, the TMU 150 may direct the complete shutdown of one or more features, or the shutdown of the whole device entirely.

Combination of Thermal Management Techniques

Several of the thermal management techniques described above may be used together to achieve an even more potent thermal response to a high temperature situation. For example, in one embodiment limiting downlink data rates is employed in conjunction with limiting, or duty-cycling, the maximum transmit power. In another embodiment, limiting the downlink data rate is employed in conjunction with disabling other advanced receiver techniques. In another embodiment, limiting dual receive diversity to a single RF chain is employed at the same time as limiting downlink data rates. In another embodiment, limiting dual receive diversity is employed at the same time as limiting uplink transmitter power and/or data rate. In another embodiment, limiting transceiver operation to a single uplink or downlink application at a time can be employed concurrently with limiting the uplink transmitter power. It will be appreciated that other combinations of the thermal management techniques provided herein are possible as well, and the above list is not to be considered exhaustive. The particular combination of thermal management techniques is application specific, and further depends on the severity of the thermal event being addressed.

Configurable Parameters

Data modules incorporating the thermal management techniques described herein can be applied to a wide variety of user equipment applications (e.g., handsets, smart phones, PDAs, data cards integrated in a laptop, data cards that are external to a laptop, to one or more specific integrated circuits in a user equipment, a modem chip, a wireless communication chip, a wireless communication chip set, other integrated circuit, etc.). Accordingly, in some embodiments, various thermal management parameters are advantageously configurable by a user, system designer, manufacturer, customer, etc. (hereinafter referred to as "the user" for simplicity), and stored in a memory (e.g., a non-volatile random access memory) for subsequent access.

For example, in one embodiment the user is able to selectively enable/disable, through the stored parameters, each individual technique of thermal management to suit the application's requirements. In a further embodiment, the user is able to tune the parameters of each thermal management technique to fit the desired application (e.g., the maximum power consumption conditions for thermal and power supply rail limitations).

In a still further embodiment, the user provided configuration is used to set a predetermined thermal model that defines other algorithmic parameters, such as timer values and temperature thresholds. The thermal model used for each application may include multiple system parameters, such as dimensions and other physical characteristics of the form factor of the data module. In one example, the timer value for temporarily limiting uplink transmit power is based on configurable quality of service (QoS) parameters (e.g., configurable by a user who is integrating a data module into user equipment, such as a handset).

In a still further embodiment, the user provided configuration is combined with actual sensor measurements of the device under thermal loads to assess the susceptibility (e.g., the Thermal Time Constant) of the device to thermal issues, such as overheating. The use of the sensor measurements can be ongoing to account for changes in the external ambient temperature, for example, which may impact the thermal behavior of the device. Based on this more real-time, application specific susceptibility rating, the TMU 150 is better able to apply the thermal management techniques provided herein.

In this way, thermal analysis can be used in conjunction with user configuration parameters, preselected and stored in memory, to enable more appropriate thermal management across various platforms, applications, devices, real-time conditions, etc.

Figure 2:
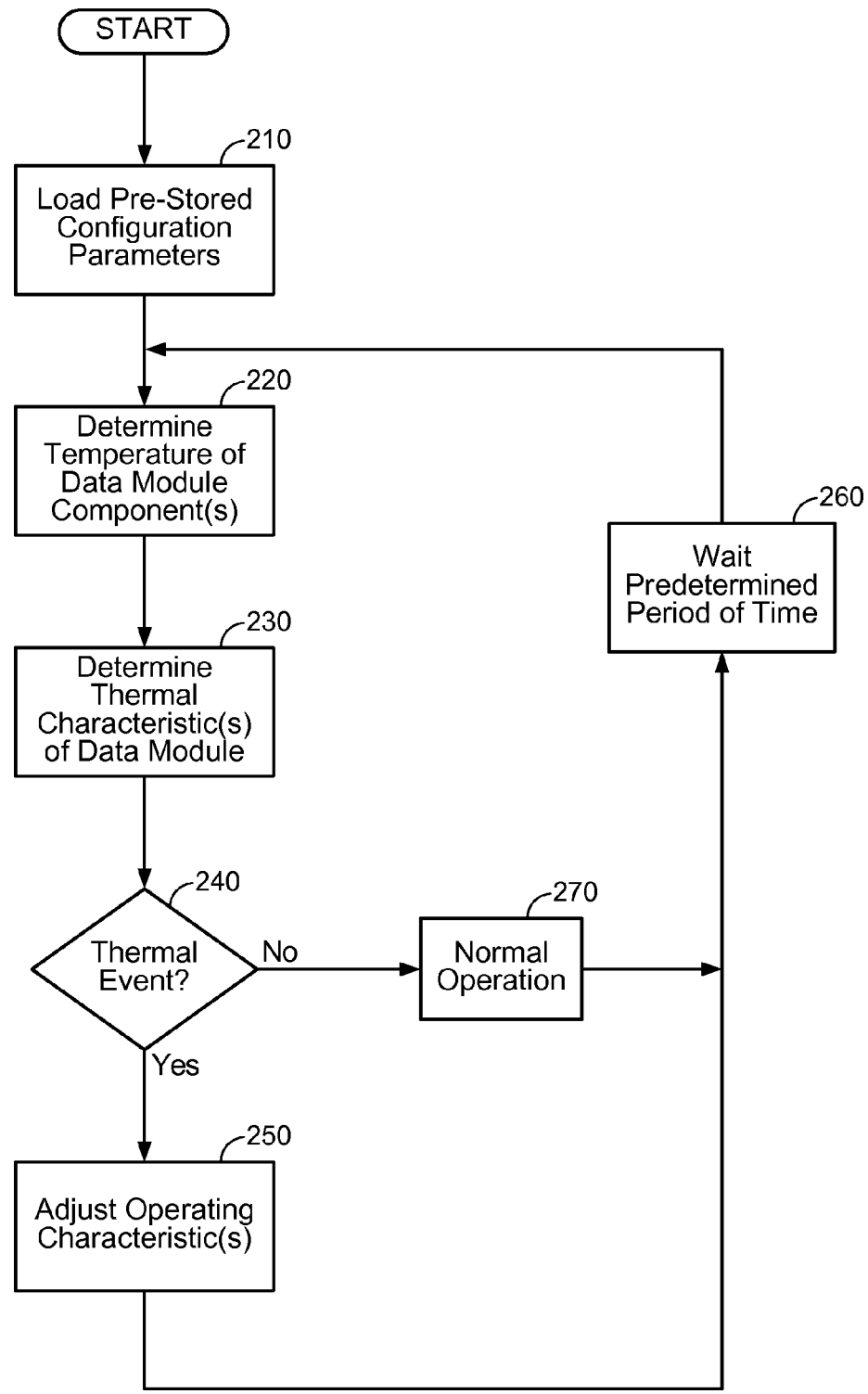
FIG. 2 is a flow diagram illustrating a method for thermal management of data modules according to an embodiment of the invention.

The forgoing thermal management techniques, procedures, and operations can be further embodied in a method for thermal management of data modules. For example, FIG. 2 is a flow diagram illustrating a method for thermal management of data modules according to an embodiment of the invention. As shown, any pre-stored configuration parameters, such as those set by a user or otherwise, are initially loaded from memory (block 210). One or more temperature sensors are then used to determine the temperature of a corresponding circuit component (e.g., components 110 of FIG. 1) (block 220). From the temperature determinations, a thermal management unit (e.g., TMU 150 of FIG. 1) determines one or more thermal characteristics (e.g., Thermal Status, Thermal Slope, Thermal Time Constant) of the data module (block 230). The thermal management unit then checks the thermal characteristics to see whether a thermal event has occurred requiring further action (block 240). If a thermal event has not occurred, processing returns to measuring the various temperatures of the various components (e.g., after a predetermined period of time) (block 220). If a thermal event has in fact occurred (e.g., Thermal Status is in the red zone), the thermal management unit adjusts one or more operating characteristics of the various circuit components using the thermal management techniques described above, or a combination of those techniques (block 250). The desired thermal management techniques are applied for a predetermined period of time (e.g., based on the determined Thermal Time Constant) (block 260), and processing returns to measuring the various temperatures of the various components (block 220). These operations work in a feedback loop configuration such that after each operating characteristic adjustment, the occurrence of a thermal event is rechecked (block 240). In some embodiments, checking for the thermal event includes using a threshold margin to provide hysteresis. If no thermal event is detected, normal operation is resumed (block 270), and, after a predetermined period of time (e.g., based on the determined Thermal Time Constant) (block 260), processing again returns to measuring the various temperatures of the various components (block 220).

Adjusting the one or more operating characteristics of the various circuit components (block 250) may be achieved through any of the thermal management techniques described herein. FIGS. 3-7 show example flow diagrams illustrating adjustment of operating characteristics for select circuit components according to one or more of the disclosed thermal management techniques. It will be appreciated that the particular thermal management techniques shown are selected for illustration purposes only, and are not to be considered exhaustive nor required for any particular circuit component. It will also be appreciated that, although the circuit components are illustrated individually, two or more circuit components may be adjusted in concert.

Figure 3:
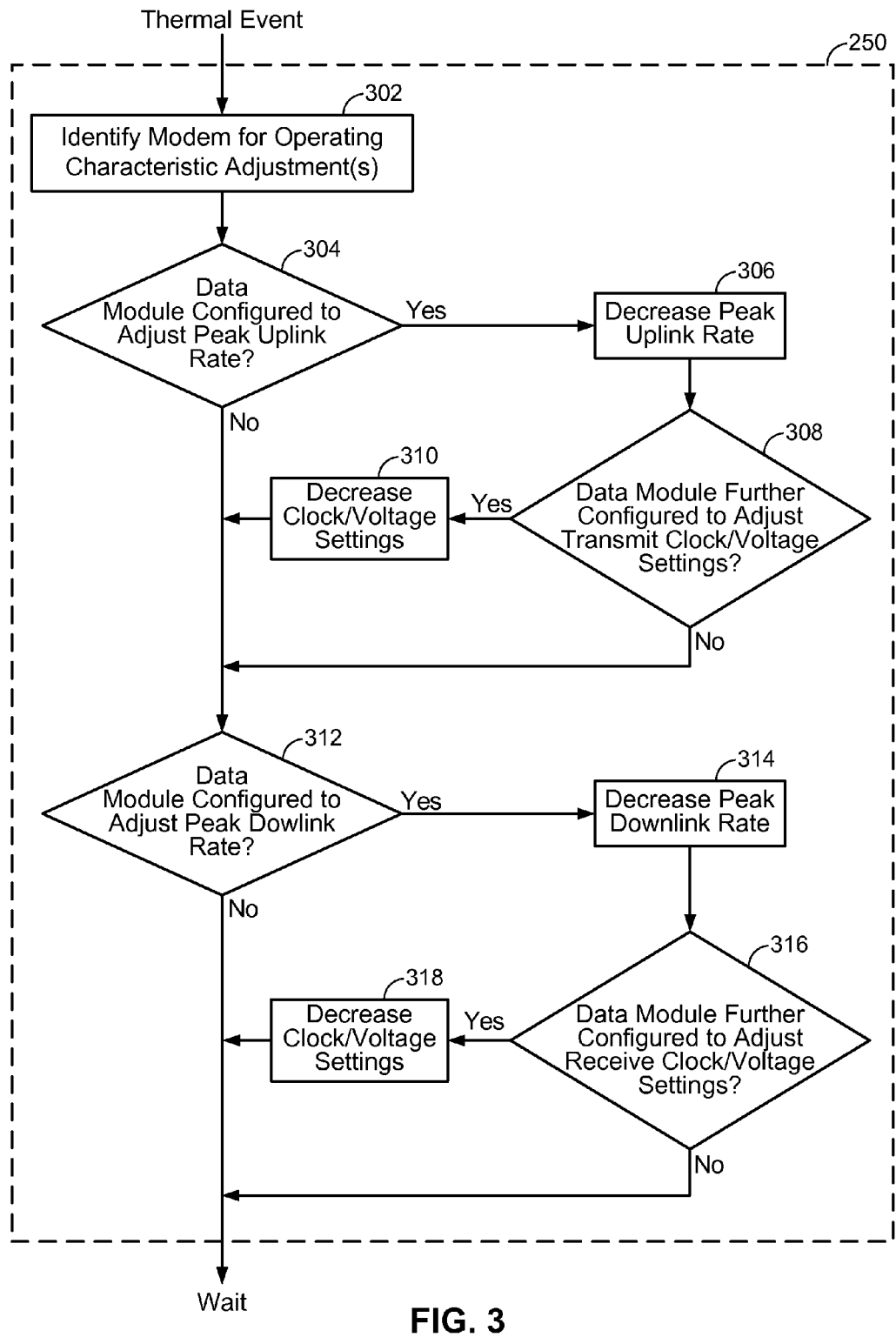
FIG. 3 illustrates adjusting the operating characteristics of a modem according to an embodiment of the invention.

FIG. 3 illustrates adjusting the operating characteristics of a modem according to an embodiment of the invention. As shown, when a thermal event occurs, one or more operating characteristics of the modem are adjusted based on the particular thermal management configurations and thermal characteristics of the data module (block 302). If the data module is configured to adjust the peak uplink rate (block 304), at least one power control point signal is generated to instruct the modem to decrease the peak uplink data rate (block 306). If the data module is configured to adjust the peak downlink rate (block 312), at least one power control point signal is generated to instruct the modem to decrease the downlink data rate (block 314). The downlink data rate may be reduced by artificially biasing signal quality feedback information intended for a base station, for example. If the data module is further configured to adjust clock/voltage settings for associated processing of received data or data to be transmitted (blocks 308/316), at least one power control point signal is generated to further instruct the modem to reduce those associated clock frequency and voltage settings (blocks 310/318).

Figure 4:
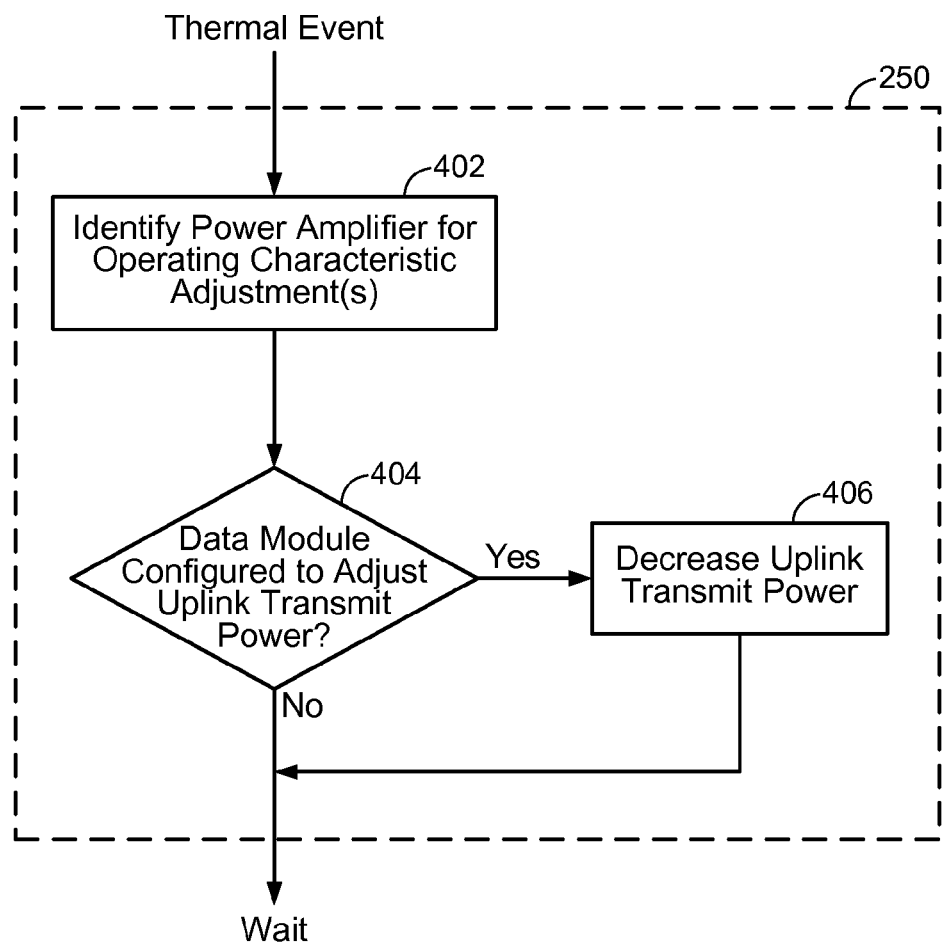
FIG. 4 illustrates adjusting the operating characteristics of a power amplifier according to an embodiment of the invention.

FIG. 4 illustrates adjusting the operating characteristics of a power amplifier according to an embodiment of the invention. As shown, when a thermal event occurs, one or more operating characteristics of the power amplifier are adjusted based on the particular thermal management configurations and thermal characteristics of the data module (block 402). If the data module is configured to limit or reduce the uplink transmit power (block 404), at least one power control point signal is generated to instruct the power amplifier to limit/reduce the uplink transmit power (block 406). The uplink transmit power may be limited sufficiently to lower the power class of the data module.

Figure 5:
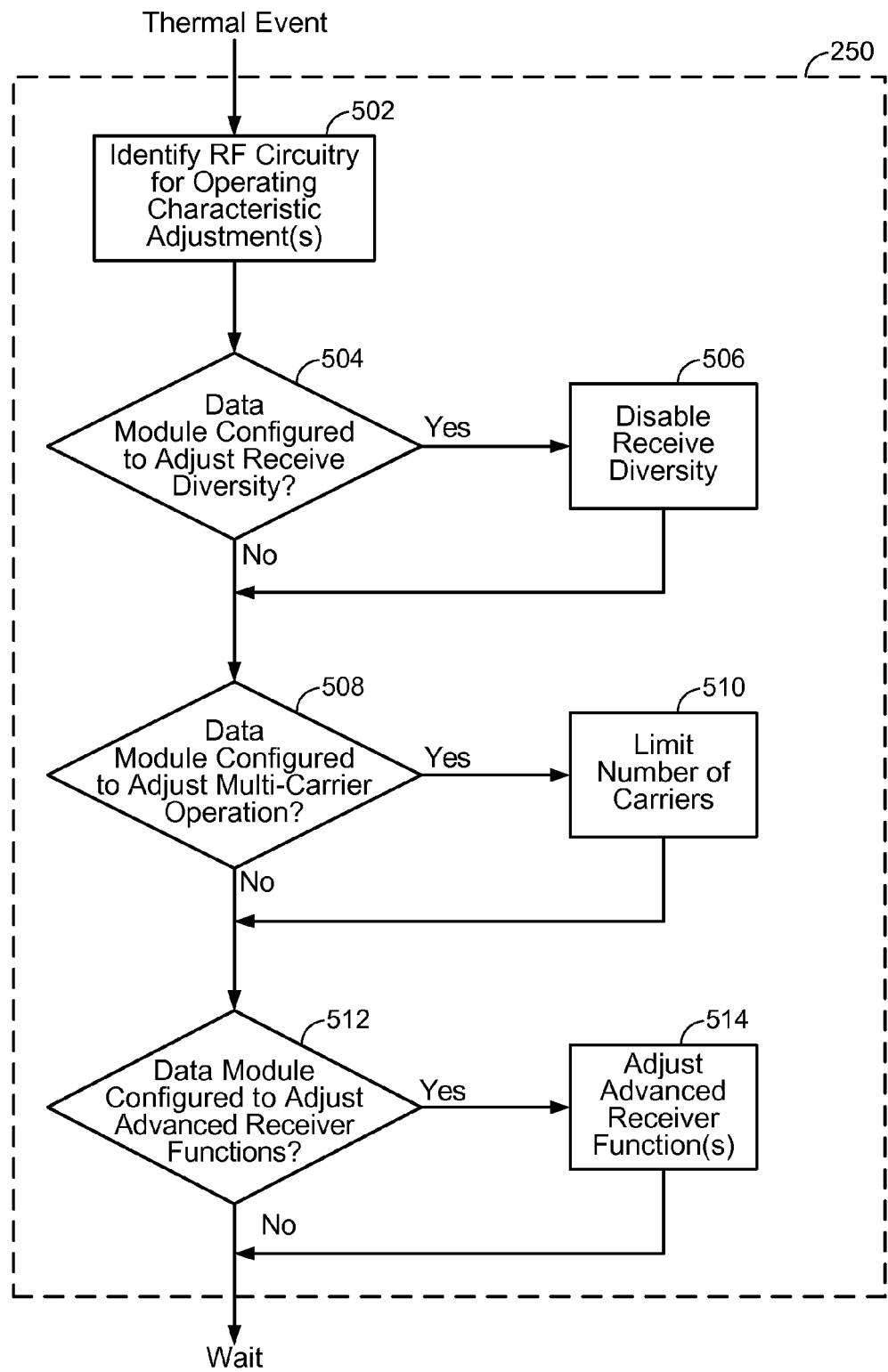
FIG. 5 illustrates adjusting the operating characteristics of RF circuitry according to an embodiment of the invention.

FIG. 5 illustrates adjusting the operating characteristics of RF circuitry according to an embodiment of the invention. As shown, when a thermal event occurs, one or more operating characteristics of the RF circuitry are adjusted based on the particular thermal management configurations and thermal characteristics of the data module (block 502). If the data module is configured to adjust receive diversity (block 504), at least one power control point signal is generated to instruct the RF circuitry to temporarily disable the receive diversity (block 506). If the data module is configured to adjust multi-carrier operation (block 508), at least one power control point signal is generated to instruct the RF circuitry to temporarily limit multi-carrier operation to a subset of assigned carriers (block 510). Accordingly, one or more assigned carriers may be dropped through coordination with a base station. The subset of assigned carriers to be retained may be selected according to a perceived signal quality of each carrier, for example. In some designs, multi-carrier operation may be temporarily disabled altogether and operation limited to a single carrier. If the data module is configured to adjust other advanced receiver functions (e.g., equalization of frequency response, interference cancellation, etc.) (block 512), at least one power control point signal is generated to instruct the RF circuitry to temporarily disable at least one of the advanced receiver functions (block 514). In some designs, advanced receiver functions are disabled only when a good quality of service is being achieved (e.g., an SNR above a predetermined threshold).

Figure 6:
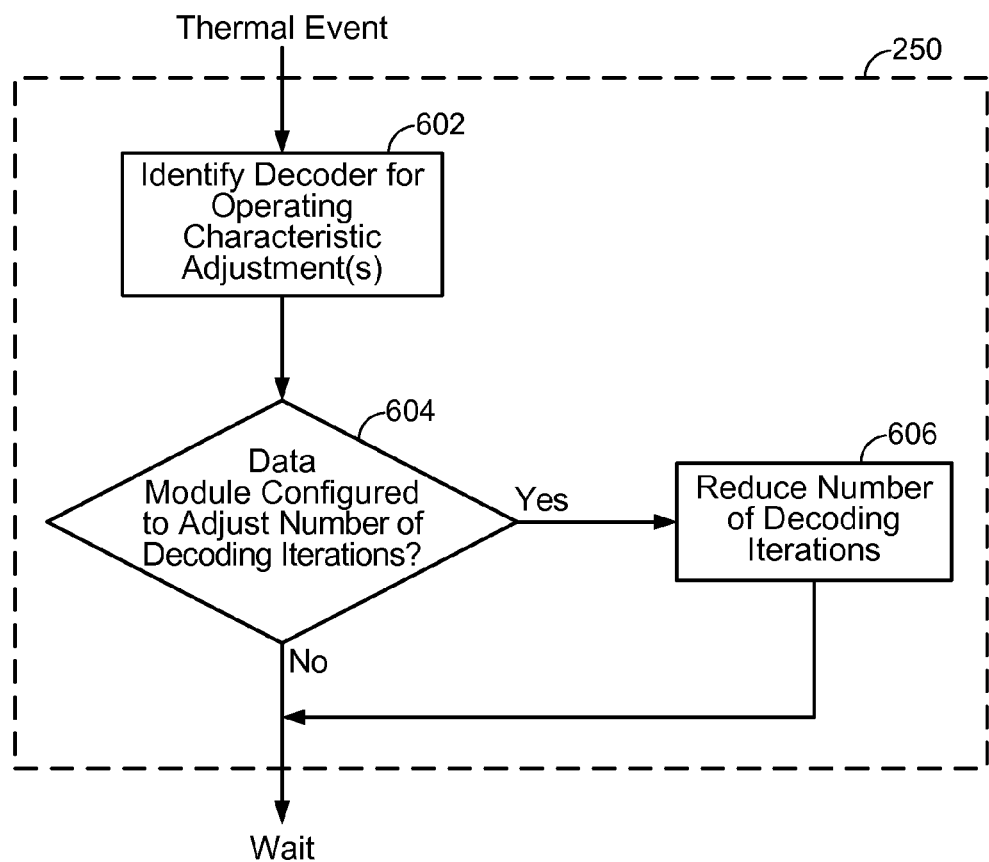
FIG. 6 illustrates adjusting the operating characteristics of a decoder according to an embodiment of the invention.

FIG. 6 illustrates adjusting the operating characteristics of a decoder according to an embodiment of the invention. As shown, when a thermal event occurs, one or more operating characteristics of the decoder are adjusted based on the particular thermal management configurations and thermal characteristics of the data module (block 602). If the data module is configured to adjust the number of decoding iterations (e.g., for a turbo decoder) (block 604), at least one power control point signal is generated to instruct the decoder to reduce the number of iterations used in decoding (block 606). The reduced number of iterations may be based on a perceived signal quality of received signals or the convergence of each iteration, for example.

Figure 7:
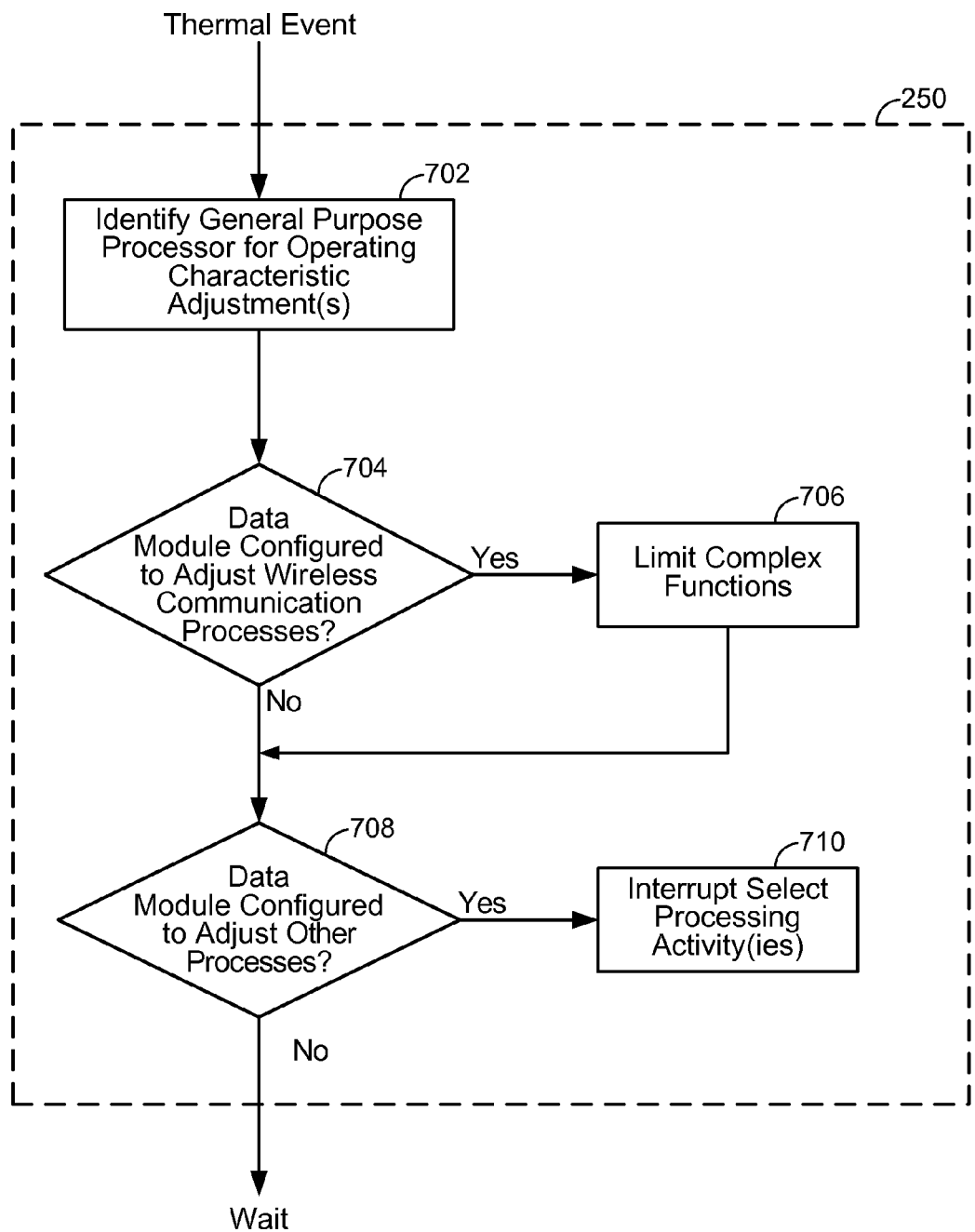
FIG. 7 illustrates adjusting the operating characteristics of an associated general purpose processor according to an embodiment of the invention.

FIG. 7 illustrates adjusting the operating characteristics of an associated general purpose processor according to an embodiment of the invention. As shown, when a thermal event occurs, one or more operating characteristics of the processor are adjusted based on the particular thermal management configurations and thermal characteristics of the data module (block 702). If the data module is configured to adjust wireless communication processing activities (block 704), at least one power control point signal is generated to instruct the processor to limit complex communication functions (e.g., restrict duplex transceiver operation to simplex operation) (block 706). For example, the execution of an uplink application simultaneously with a downlink application may be disallowed. If the data module is configured to adjust other processing activities (e.g., multi-media applications) (block 708), at least one power control point signal is generated to instruct the processor to interrupt one or more of these processing activities (block 710).

The techniques described herein provide advantages, such as, but not limited to, one or more of the following: increased predictability of thermal trends, prevention of physical damage to components, heightened compliance with thermal requirements, reducing elevated touch temperatures or other user specific concerns and requirements.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer readable media embodying a method for thermal management of a data module. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A data module operable in a wireless communication system, the data module comprising:
   a circuit component;
   a temperature sensor configured to determine a temperature of the circuit component; and
   a thermal management unit configured to:
      determine a thermal characteristic of the data module based on the temperature; and
      adjust at least one operating characteristic of the circuit component as part of a feedback control loop to maintain the thermal characteristic at or below a threshold level, wherein the at least one operating characteristic is adjusted based on the thermal characteristic;
   wherein the thermal characteristic has an associated threshold margin to generate hysteresis at the feedback control loop, and wherein the temperature is reduced below the threshold level less the associated threshold margin after detection of a thermal event.

2. The data module of claim 1, wherein the thermal characteristic includes a thermal status indicating an operation of the data module in a temperature range.

3. The data module of claim 1, wherein the circuit component includes a modem for modulating and demodulating information, and wherein adjusting the at least one operating characteristic includes at least one power control point signal instructing the modem to decrease a peak uplink data rate or decrease a peak downlink data rate.

4. The data module of claim 3, wherein the at least one power control point signal further instructs the modem to:
   reduce a clock frequency for processing communication data; and
   reduce voltage settings for processing the communication data.

5. The data module of claim 3, wherein the peak downlink data rate is reduced by artificially biasing signal quality feedback information for a base station, and wherein the signal quality feedback information indicates a quality of signal reception less than a measured quality of signal reception.

6. The data module of claim 1, wherein the plurality of circuit components includes a power amplifier, and at least one power control point signal instructs the power amplifier to limit or reduce uplink transmit power.

7. The data module of claim 1, wherein the plurality of circuit components includes radio frequency transceiver circuitry, and at least one power control point signal instructs the radio frequency transceiver circuitry to perform at least one of:
   temporarily disabling receive diversity;
   temporarily limiting multi-carrier operation to a subset of assigned carriers; or
   temporarily disabling at least one advanced receiver function.

8. The data module of claim 7, wherein one or more assigned carriers is dropped through coordination with a base station.

9. The data module of claim 7, wherein the subset of assigned carriers is selected according to a perceived signal quality of each carrier.

10. The data module of claim 7, wherein the at least one advanced receiver function includes at least one of:
    equalization of the transceiver circuitry frequency response; or
    interference cancellation.

11. The data module of claim 7, wherein the at least one advanced receiver function is disabled only when a signal-to-noise ratio is above a predetermined threshold indicating a good quality of service.

12. The data module of claim 1, wherein the plurality of circuit components includes a turbo decoder, and at least one power control point signal instructs the turbo decoder to reduce a number of iterations used in decoding.

13. The data module of claim 12, wherein the thermal management unit determines the reduced number of iterations based on at least one of:
    a perceived signal quality of received signals; or
    a convergence of each iteration.

14. The data module of claim 1, wherein the thermal management unit is coupled to or integrated with a general purpose processor, the thermal management unit being further configured to limit one or more processing activities of the processor.

15. The data module of claim 14, wherein limiting the one or more processing activities includes at least one of:
    interrupting execution of a multi-media application;
    restricting duplex transceiver operation to simplex operation; or
    disallowing the execution of an uplink application simultaneously with a downlink application.

16. The data module of claim 1, wherein the thermal management unit generates at least two power control point signals to concurrently adjust at least two operating characteristics of the data module.

17. The data module of claim 16, wherein the at least two adjusted operating characteristics include at least one of the following combinations:
    limiting an uplink or downlink data rate at a modem and limiting a maximum transmit power at a power amplifier;
    limiting an uplink or downlink data rate at a modem and disabling at least one advanced receiver function of associated radio frequency transceiver circuitry;
    limiting an uplink or downlink data rate at the modem and limiting receive diversity to a single receiver of associated radio frequency transceiver circuitry; or
    limiting associated radio frequency transceiver operation to a single uplink or downlink application at a time and limiting uplink transmit power.

18. The data module of claim 1, wherein the thermal management unit is further configured to generate at least one power control point signal based on thermal management parameters stored in a memory that selectively enable adjustment of the at least one operating characteristic, wherein select thermal management parameters of the thermal management parameters are configurable by a user of the data module.

19. The data module of claim 18, wherein at least one of the select thermal management parameters sets a maximum power consumption of one of the plurality of circuit components.

20. The data module of claim 1, wherein determining the thermal characteristic comprises retrieving thermal management parameters stored in a memory and characterizing a thermal model associated with the thermal characteristic of the data module, wherein the thermal management parameters are configurable by a user of the data module.

21. The data module of claim 20, wherein one or more of the thermal management parameters defines at least one of:
   physical characteristics of a form factor of the data module used in the thermal model;
   a predetermined period of time for adjusting the at least one operating characteristic; or
   a temperature threshold associated with adjusting the at least one operating characteristic.

22. The data module of claim 1, wherein the temperature is determined indirectly based on an operating current.

23. The data module of claim 1, wherein the thermal characteristic includes a thermal slope indicating a change in temperature of the data module over time.

24. The data module of claim 1, wherein the thermal characteristic includes a thermal time constant associated with achieving thermal equilibrium in response to a change in temperature.

25. The data module of claim 1, wherein the at least one operating characteristic includes at least one of an uplink data rate of a modem, a downlink data rate of the modem, an uplink transmit power of a power amplifier, a receive diversity of radio-frequency (RF) circuitry, a number of decoding iterations of a decoder, or wireless communication activities of a general purpose processor.

26. The data module of claim 1, wherein the feedback control loop provides an output of the thermal management unit to the circuit component based on an input provided to the thermal management unit from the circuit component, and wherein the at least one operating characteristic is adjusted based on the output.

27. A method for thermal management of a data module comprising a circuit component operable in a wireless communication system, the method comprising:
   determining a temperature of the circuit component using a temperature sensor;
   determining a thermal characteristic of the data module based on the temperature; and
   adjusting at least one operating characteristic of the circuit component as part of a feedback control loop to maintain the thermal characteristic at or below a threshold level, wherein the at least one operating characteristic is adjusted based on the thermal characteristic;
   wherein the thermal characteristic has an associated threshold margin to generate hysteresis at the feedback control loop, and wherein the temperature is reduced below the threshold level less the associated threshold margin after detection of a thermal event.

28. The method of claim 27, wherein the thermal characteristic includes a thermal status indicating an operation of the data module in a temperature range.

29. The method of claim 27, wherein adjusting the at least one operating characteristic includes:
   decreasing a peak uplink data rate of a modem for modulating and demodulating information; or
   decreasing a peak downlink data rate of the modem for modulating and demodulating information.

30. The method of claim 29, wherein adjusting the at least one operating characteristic further includes:
   reducing a clock frequency for processing communication data; and
   reducing voltage settings for processing the communication data.

31. The method of claim 29, wherein decreasing the peak downlink data rate includes artificially biasing signal quality feedback information for a base station, and wherein the signal quality feedback information indicates a quality of signal reception less than a measured quality of signal reception.

32. The method of claim 27, wherein adjusting the at least one operating characteristic of one or more target components includes limiting or reducing uplink transmit power provided by a power amplifier.

33. The method of claim 27, wherein adjusting the at least one operating characteristic of one or more target components includes at least one of:
   temporarily disabling receive diversity of associated radio frequency transceiver circuitry; or
   temporarily limiting multi-carrier operation of associated radio frequency transceiver circuitry to a subset of assigned carriers.

34. The method of claim 33, further comprising selecting the subset of assigned carriers according to a perceived signal quality of each carrier.

35. The method of claim 27, wherein adjusting the at least one operating characteristic of one or more target components includes temporarily disabling at least one advanced receiver function selected from:
   equalization of transceiver circuitry frequency response; or
   interference cancellation.

36. The method of claim 35, wherein the disabling is performed only when a signal-to-noise ratio is above a predetermined threshold indicating a good quality of service.

37. The method of claim 27, wherein adjusting the at least one operating characteristic of one or more target components includes reducing a number of turbo decoder iterations used in decoding a received signal.

38. The method of claim 37, further comprising determining the reduced number of iterations based on a perceived signal quality of received signals or a convergence of each iteration.

39. The method of claim 27, wherein adjusting the at least one operating characteristic of one or more target components includes limiting one or more processing activities of a general purpose processor integrated with or coupled to the data module.

40. The method of claim 39, wherein limiting one or more of the processing activities includes at least one of:
   interrupting execution of a multi-media application;
   restricting duplex transceiver operation to simplex operation; or
   disallowing execution of an uplink application simultaneously with a downlink application.

41. The method of claim 27, wherein at least two operating characteristics are adjusted.

42. The method of claim 41, wherein the at least two adjusted operating characteristics include at least one of the following combinations:
   limiting an uplink or downlink data rate of a modem and limiting a maximum transmit power of a power amplifier;
   limiting a downlink data rate of a modem and disabling at least one advanced receiver function of associated radio frequency transceiver circuitry;
   limiting an uplink or downlink data rate of a modem and limiting receive diversity to a single receiver of associated radio frequency transceiver circuitry; or limiting radio frequency transceiver operation to a single uplink or downlink application at a time and limiting uplink transmit power.

43. The method of claim 27, further comprising selecting the at least one operating characteristic to adjust by retrieving thermal management parameters stored in a memory and characterizing a thermal model associated with the thermal characteristic, wherein the thermal management parameters are configurable by a user of the data module.

44. The method of claim 43, wherein the thermal model defines at least one period of time for adjusting the at least one operating characteristic.

45. The method of claim 27, wherein the temperature is determined indirectly based on an operating current.

46. The method of claim 27, wherein the thermal characteristic includes a thermal slope indicating a change in temperature of the data module over time.

47. The method of claim 27, wherein the thermal characteristic includes a thermal time constant associated with achieving thermal equilibrium in response to a change in temperature.

48. The method of claim 27, wherein the at least one operating characteristic includes at least one of an uplink data rate of a modem, a downlink data rate of the modem, an uplink transmit power of a power amplifier, a receive diversity of radio-frequency (RF) circuitry, a number of decoding iterations of a decoder, or wireless communication activities of a general purpose processor.

49. The method of claim 27, wherein the feedback control loop provides an output of the thermal management unit to the circuit component based on an input provided to the thermal management unit from the circuit component, and wherein the at least one operating characteristic is adjusted based on the output.

50. A data module operable in a wireless communication system, the data module comprising:
a circuit component;
a means for determining a temperature of the circuit component;
means for determining a one or more thermal characteristic of the data module based the temperature; and
means for adjusting at least one operating characteristic of the circuit component as part of a feedback control loop to maintain the thermal characteristic at or below a threshold level, wherein the at least one operating characteristic is adjusted based on the thermal characteristic;
wherein the thermal characteristic has an associated threshold margin to generate hysteresis at the feedback control loop, and wherein the temperature is reduced below the threshold level less the associated threshold margin after detection of a thermal event.

51. The data module of claim 50, wherein the thermal characteristic includes a thermal status indicating an operation of the data module in a temperature range.

52. The data module of claim 50, wherein the means for adjusting the at least one operating characteristic includes:
means for decreasing a peak uplink data rate of a modem for modulating and demodulating information; or
means for decreasing a peak downlink data rate of the modem for modulating and demodulating information.

53. The data module of claim 52, wherein the means for adjusting the at least one operating characteristic further includes:
means for reducing a clock frequency for processing communication data; and
means for reducing voltage settings for processing the communication data.

54. The data module of claim 52, wherein the means for decreasing the peak downlink data rate includes means for artificially biasing signal quality feedback information for a base station, and wherein the signal quality feedback information indicates a quality of signal reception less than a measured quality of signal reception.

55. The data module of claim 50, wherein the means for adjusting the at least one operating characteristic of one or more target components includes means for limiting or reducing uplink transmit power provided by a power amplifier.

56. The data module of claim 50, wherein the means for adjusting the at least one operating characteristic of one or more target components includes at least one of:
means for temporarily disabling receive diversity of associated radio frequency transceiver circuitry; or
means for temporarily limiting multi-carrier operation of associated radio frequency transceiver circuitry to a subset of assigned carriers.

57. The data module of claim 56, further comprising means for selecting the subset of assigned carriers according to a perceived signal quality of each carrier.

58. The data module of claim 50, wherein the means for adjusting the at least one operating characteristic of one or more target components includes means for temporarily disabling at least one advanced receiver function selected from:
equalization of transceiver circuitry frequency response; or
interference cancellation.

59. The data module of claim 58, wherein the disabling is performed only when a signal-to-noise ratio is above a predetermined threshold indicating a good quality of service.

60. The data module of claim 50, wherein the means for adjusting the at least one operating characteristic of one or more target components includes means for reducing a number of turbo decoder iterations used in decoding a received signal.

61. The data module of claim 60, further comprising means for determining the reduced number of iterations based on a perceived signal quality of received signals or a convergence of each iteration.

62. The data module of claim 50, wherein the means for adjusting the at least one operating characteristic of one or more target components includes means for limiting one or more processing activities of a general purpose processor integrated with or coupled to the data module.

63. The data module of claim 62, wherein the means for limiting one or more of the processing activities includes at least one of:
means for interrupting execution of a multi-media application;
means for restricting duplex transceiver operation to simplex operation; or
means for disallowing execution of an uplink application simultaneously with a downlink application.

64. The data module of claim 50, wherein at least two operating characteristics are adjusted.

65. The data module of claim 64, wherein the means for adjusting the operating characteristics includes at least one of the following combinations:
means for limiting an uplink or downlink data rate of a modem and means for limiting a maximum transmit power of a power amplifier;
means for limiting a downlink data rate of a modem and means for disabling at least one advanced receiver function of associated radio frequency transceiver circuitry;
means for limiting an uplink or downlink data rate of a modem and limiting receive diversity to a single receiver of associated radio frequency transceiver circuitry; or means for limiting radio frequency transceiver operation to a single uplink or downlink application at a time and limiting uplink transmit power.

66. The data module of claim 50, further comprising means for selecting the at least one operating characteristic to adjust according to thermal management parameters stored in a memory, the thermal management parameters characterizing a thermal model associated with the thermal characteristic, wherein the thermal management parameters are configurable by a user of the data module.

67. The data module of claim 66, wherein the thermal model defines at least one period of time for adjusting the at least one operating characteristic.

68. The data module of claim 50, wherein the temperature is determined indirectly based on an operating current.

69. The data module of claim 50, wherein the thermal characteristic includes a thermal slope indicating a change in temperature of the data module over time.

70. The data module of claim 50, wherein the thermal characteristic includes a thermal time constant associated with achieving thermal equilibrium in response to a change in temperature.

71. The data module of claim 50, wherein the at least one operating characteristic includes at least one of an uplink data rate of a modem, a downlink data rate of the modem, an uplink transmit power of a power amplifier, a receive diversity of radio-frequency (RF) circuitry, a number of decoding iterations of a decoder, or wireless communication activities of a general purpose processor.

72. The data module of claim 50, wherein the feedback control loop provides an output of the thermal management unit to the circuit component based on an input provided to the thermal management unit from the circuit component, and wherein the at least one operating characteristic is adjusted based on the output.

73. A non-transitory computer-readable medium comprising code, which, when executed by a processor, causes the processor to perform thermal management operations for a data module comprising a circuit component and operable in a wireless communication system, the computer-readable medium comprising:
 code for determining a temperature of the circuit component;
 code for determining a thermal characteristic of the data module based on the temperature; and
 code for adjusting at least one operating characteristic of the circuit component as part of a feedback control loop to maintain the thermal characteristic at or below a threshold level, wherein the at least one operating characteristic is adjusted based on the thermal characteristic;
 wherein the thermal characteristic has an associated threshold margin to generate hysteresis at the feedback control loop, and wherein the temperature is reduced below the threshold level less the associated threshold margin after detection of a thermal event.

74. The non-transitory computer-readable medium of claim 73, wherein the thermal characteristic includes a thermal status indicating an operation of the data module in a temperature range.

75. The non-transitory computer-readable medium of claim 73, wherein the code for adjusting the at least one operating characteristic includes:
 code for decreasing a peak uplink data rate of a modem for modulating and demodulating information; or
 code for decreasing a peak downlink data rate of the modem for modulating and demodulating information.

76. The non-transitory computer-readable medium of claim 75, wherein the code for adjusting the at least one operating characteristic further includes:
 code for reducing a clock frequency for processing communication data; and
 code for reducing voltage settings for processing the communication data.

77. The non-transitory computer-readable medium of claim 75, wherein the code for decreasing the peak downlink data rate includes code for artificially biasing signal quality feedback information for a base station, and wherein the signal quality feedback information indicates a quality of signal reception less than a measured quality of signal reception.

78. The non-transitory computer-readable medium of claim 73, wherein the code for adjusting the at least one operating characteristic of one or more target components includes code for limiting or reducing uplink transmit power provided by a power amplifier.

79. The non-transitory computer-readable medium of claim 73, wherein the code for adjusting the at least one operating characteristic of one or more target components includes at least one of:
 code for temporarily disabling receive diversity of associated radio frequency transceiver circuitry; or
 code for temporarily limiting multi-carrier operation of associated radio frequency transceiver circuitry to a subset of assigned carriers.

80. The non-transitory computer-readable medium of claim 79, further comprising code for selecting the subset of assigned carriers according to a perceived signal quality of each carrier.

81. The non-transitory computer-readable medium of claim 73, wherein the code for adjusting the at least one operating characteristic of one or more target components includes code for temporarily disabling at least one advanced receiver function selected from:
 equalization of transceiver circuitry frequency response; or
 interference cancellation.

82. The non-transitory computer-readable medium of claim 81, wherein the disabling is performed only when a signal-to-noise ratio is above a predetermined threshold indicating a good quality of service.

83. The non-transitory computer-readable medium of claim 73, wherein the code for adjusting the at least one operating characteristic of one or more target components includes code for reducing a number of turbo decoder iterations used in decoding a received signal.

84. The non-transitory computer-readable medium of claim 83, further comprising code for determining the reduced number of iterations based on a perceived signal quality of received signals or a convergence of each iteration.

85. The non-transitory computer-readable medium of claim 73, wherein the code for adjusting the at least one operating characteristic of one or more target components includes code for limiting one or more processing activities of a general purpose processor integrated with or coupled to the data module.

86. The non-transitory computer-readable medium of claim 85, wherein the code for limiting one or more of the processing activities includes at least one of:
 code for interrupting execution of a multi-media application;
 code for restricting duplex transceiver operation to simplex operation; or
 code for disallowing execution of an uplink application simultaneously with a downlink application.

87. The non-transitory computer-readable medium of claim 73, wherein at least two operating characteristics are adjusted.

88. The non-transitory computer-readable medium of claim 87, wherein the code for adjusting the operating characteristics includes at least one of the following combinations:
   code for limiting an uplink or downlink data rate of a modem and code for limiting a maximum transmit power of a power amplifier;
   code for limiting a downlink data rate of a modem and code for disabling at least one advanced receiver function of associated radio frequency transceiver circuitry;
   code for limiting an uplink or downlink data rate of a modem and limiting receive diversity to a single receiver of associated radio frequency transceiver circuitry; or
   code for limiting radio frequency transceiver operation to a single uplink or downlink application at a time and limiting uplink transmit power.

89. The non-transitory computer-readable medium of claim 73, further comprising code for selecting at least one operating characteristic to adjust by retrieving thermal management parameters stored in a memory and characterizing a thermal model associated with the thermal characteristic, wherein the thermal management parameters are configurable by a user of the data module.

90. The non-transitory computer-readable medium of claim 89, wherein the thermal model defines at least one predetermined period of time for adjusting the at least one operating characteristic.

91. The non-transitory computer-readable medium of claim 73, wherein the temperature is determined indirectly based on an operating current.

92. The non-transitory computer-readable medium of claim 73, wherein the thermal characteristic includes a thermal slope indicating a change in temperature of the data module over time.

93. The non-transitory computer-readable medium of claim 73, wherein the thermal characteristic includes a thermal time constant associated with achieving thermal equilibrium in response to a change in temperature.

94. The non-transitory computer-readable medium of claim 73, wherein the at least one operating characteristic includes at least one of an uplink data rate of a modem, a downlink data rate of the modem, an uplink transmit power of a power amplifier, a receive diversity of radio-frequency (RF) circuitry, a number of decoding iterations of a decoder, or wireless communication activities of a general purpose processor.

95. The non-transitory computer-readable medium of claim 73, wherein the feedback control loop provides an output of the thermal management unit to the circuit component based on an input provided to the thermal management unit from the circuit component, and wherein the at least one operating characteristic is adjusted based on the output.

96. A data module operable in a wireless communication system, the data module comprising:
   a plurality of circuit components;
   one or more temperature sensors configured to determine a temperature of a corresponding circuit component; and
   a thermal management unit configured to determine one or more thermal characteristics of the data module based on the temperature, and to generate one or more power control point signals indicating whether to adjust corresponding operating characteristics of one or more target circuit components from the plurality of circuit components based on the one or more determined thermal characteristics, wherein the thermal management unit is further configured to adjust corresponding operating characteristics of a target circuit component of the one or more target circuit components as part of a feedback control loop to maintain the one or more determined thermal characteristics at or below a desired threshold level, wherein at least one determined thermal characteristic of the one or more determined thermal characteristics has an associated threshold margin providing hysteresis to the feedback control loop, the feedback control loop returning the at least one determined thermal characteristic to below the associated threshold margin when the at least one determined thermal characteristic reaches or exceeds the desired threshold level.

97. A method for thermal management of a data module comprising a plurality of circuit components and operable in a wireless communication system, the method comprising:
   determining a temperature of one or more of the circuit components;
   determining one or more thermal characteristics of the data module based on the temperature; and
   adjusting at least one operating characteristic of one or more target circuit components from the plurality of circuit components based on the one or more determined thermal characteristics as part of a feedback control loop to maintain the one or more determined thermal characteristics at or below a desired threshold level, wherein at least one determined thermal characteristic of the one or more determined thermal characteristics has an associated threshold margin providing hysteresis to the feedback control loop, the feedback control loop returning the at least one determined thermal characteristic to below the associated threshold margin when the at least one determined thermal characteristic reaches or exceeds the desired threshold level.

98. A data module operable in a wireless communication system, the data module comprising:
   a plurality of circuit components;
   means for determining a temperature of one or more of the circuit components;
   means for determining one or more thermal characteristics of the data module based on the temperature; and
   means for adjusting at least one operating characteristic of one or more target circuit components from the plurality of circuit components based on the one or more determined thermal characteristics as part of a feedback control loop to maintain the one or more determined thermal characteristics at or below a desired threshold level, wherein at least one determined thermal characteristic of the one or more determined thermal characteristics has an associated threshold margin providing hysteresis to the feedback control loop, the feedback control loop returning the at least one determined thermal characteristic to below the threshold margin when the at least one determined thermal characteristic reaches or exceeds the desired threshold level.

99. A non-transitory computer-readable medium comprising code, which, when executed by a processor, causes the processor to perform thermal management operations for a data module comprising a plurality of circuit components and operable in a wireless communication system, the computer-readable medium comprising:
   code for determining a temperature of one or more of the circuit components;
   code for determining one or more thermal characteristics of the data module based on the temperature; and code for adjusting at least one operating characteristic of one or more target circuit components from the plurality of circuit components based on the one or more determined thermal characteristics as part of a feedback control loop to maintain the one or more determined thermal characteristics at or below a desired threshold level, wherein at least one determined thermal characteristic of the one or more determined thermal characteristics has an associated threshold margin providing hysteresis to the feedback control loop, the feedback control loop returning the at least one determined thermal characteristic to below the associated threshold margin when the at least one determined thermal characteristic reaches or exceeds the desired threshold level.

100. A data module comprising:
a first component including a first temperature sensor and a first circuit, the first temperature sensor configured to determine a first temperature of the first circuit; and
a thermal management unit configured to:
  determine a first thermal characteristic of the data module based on the first temperature; and
  adjust the at least one operating characteristic of the first component as part of a feedback control loop to maintain the first thermal characteristic at or below a threshold level, wherein the at least one operating characteristic is adjusted based on the first thermal characteristic;
wherein the first thermal characteristic has an associated threshold margin to generate hysteresis at the feedback control loop, and wherein the first temperature is reduced below the threshold level less the associated threshold margin after detection of a thermal event.

* * * * *